United States Patent
Kao et al.

(10) Patent No.: US 12,287,528 B2
(45) Date of Patent: Apr. 29, 2025

(54) OPTICAL ELEMENT DRIVING MECHANISM

(71) Applicant: TDK TAIWAN CORP., Taoyuan (TW)

(72) Inventors: Kuo-Chun Kao, Taoyuan (TW); Meng-Ting Lin, Taoyuan (TW); Wei-Han Hsia, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 564 days.

(21) Appl. No.: 17/683,632

(22) Filed: Mar. 1, 2022

(65) Prior Publication Data
US 2022/0269038 A1  Aug. 25, 2022

Related U.S. Application Data

(63) Continuation of application No. 16/510,066, filed on Jul. 12, 2019, now Pat. No. 11,294,141.

(30) Foreign Application Priority Data

Jul. 1, 2019  (CN) .......................... 201910585143.6

(51) Int. Cl.
*G02B 7/09*  (2021.01)
*G02B 7/08*  (2021.01)
(Continued)

(52) U.S. Cl.
CPC ................. *G02B 7/09* (2013.01); *G02B 7/08* (2013.01); *G02B 27/646* (2013.01);
(Continued)

(58) Field of Classification Search
CPC .......... G02B 7/09; G02B 7/08; G02B 27/646; H04N 23/55; H04N 23/57
See application file for complete search history.

(56) References Cited

U.S. PATENT DOCUMENTS

| 7,157,929 B1* | 1/2007 | Kuo .................. G09G 3/006 324/756.07 |
| 2005/0168584 A1 | 8/2005 | Uenaka |

(Continued)

FOREIGN PATENT DOCUMENTS

| CN | 205211518 U | 5/2016 |
| KR | 20140132468 A | 11/2014 |
| TW | 201504745 A | 2/2015 |

OTHER PUBLICATIONS

Office Action issued on Apr. 21, 2022 for the corresponding Application No. 201910585143.6 in China.
Machine translation of KR 20140132468; Aug. 24, 2021.

*Primary Examiner* — Cara E Rakowski
(74) *Attorney, Agent, or Firm* — MUNCY, GEISSLER, OLDS & LOWE, P.C.

(57) ABSTRACT

An optical element driving mechanism is provided. The optical element driving mechanism includes a fixed part, a movable part, a first driving assembly, and a strengthening member. The fixed part includes a first base. The movable part is connected to an optical element with an optical axis. The movable part is movable relative to the fixed part, and the movable part is accommodated in the fixed part. The first driving assembly drives the movable part to move relative to the fixed part. The first driving assembly is disposed in the first base. The strengthening member is embedded in the first base. When viewed along a direction that is perpendicular to the optical axis, the strengthening member at least partially overlaps the first driving assembly. When viewed along the optical axis, the strengthening member does not overlap the first driving assembly.

17 Claims, 16 Drawing Sheets

Related U.S. Application Data

(60) Provisional application No. 62/697,621, filed on Jul. 13, 2018.

(51) Int. Cl.
*G02B 27/64* (2006.01)
*H02K 41/035* (2006.01)
*H04N 23/55* (2023.01)
*H04N 23/57* (2023.01)

(52) U.S. Cl.
CPC ..... *H02K 41/0354* (2013.01); *H02K 41/0356* (2013.01); *H04N 23/55* (2023.01); *H04N 23/57* (2023.01)

(56) References Cited

U.S. PATENT DOCUMENTS

| | | | |
|---|---|---|---|
| 2010/0253769 A1* | 10/2010 | Coppeta | G02B 27/286 353/7 |
| 2014/0247389 A1* | 9/2014 | Lee | H04N 23/51 348/373 |
| 2015/0022891 A1 | 1/2015 | Hu et al. | |
| 2016/0012950 A1* | 1/2016 | Nishino | H02K 41/0356 216/13 |
| 2018/0115636 A1* | 4/2018 | Hu | G02B 7/08 |
| 2018/0364446 A1* | 12/2018 | Osaka | G02B 7/09 |
| 2019/0033613 A1* | 1/2019 | Takimoto | H04N 23/55 |

* cited by examiner

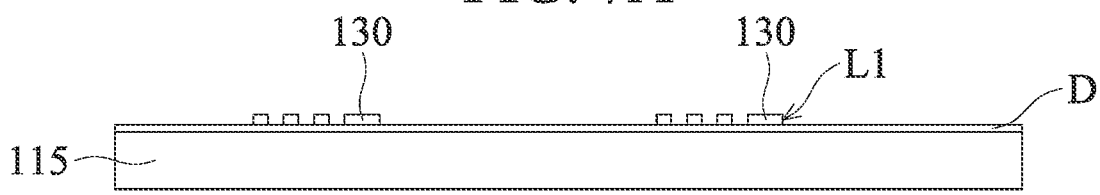
FIG. 7A
FIG. 7B
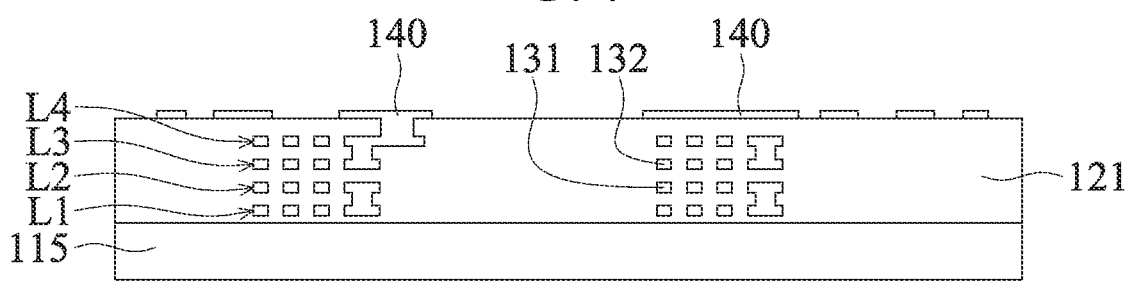
FIG. 7C
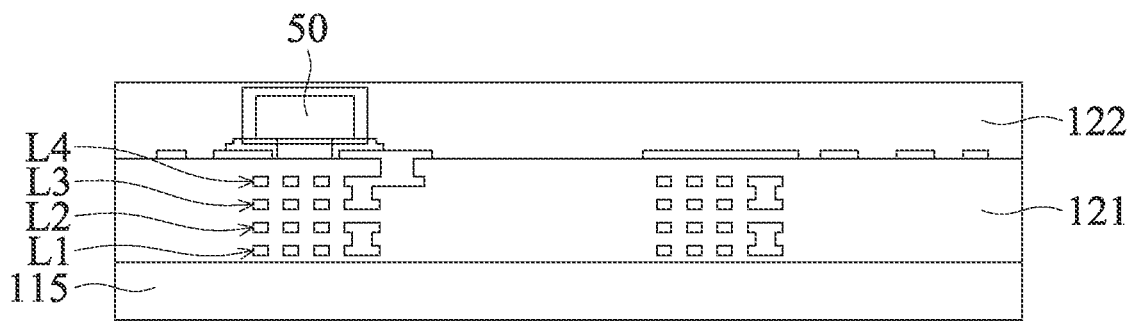
FIG. 7D
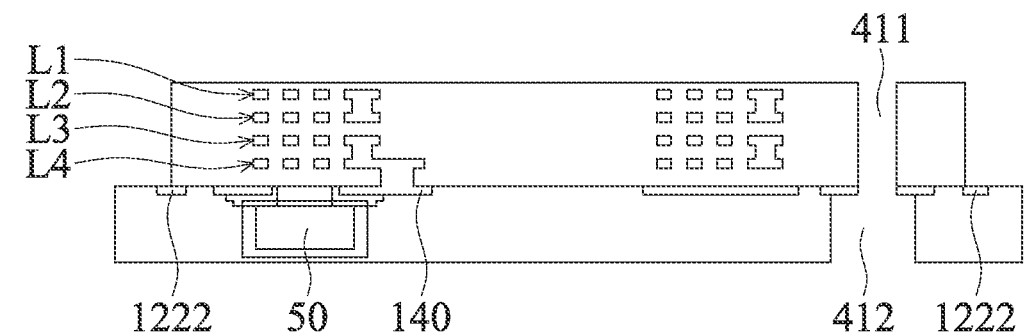
FIG. 7E

OPTICAL ELEMENT DRIVING MECHANISM

CROSS-REFERENCE TO RELATED APPLICATIONS

The present application is a Continuation of U.S. patent application Ser. No. 16/510,066, filed Jul. 12, 2019, which claims priority of U.S. Provisional Patent Application No. 62/697,621, filed Jul. 13, 2018, and C.N. Application No. 201910585143.6, filed Jul. 1, 2019, the entirety of which is incorporated by reference herein.

BACKGROUND OF THE DISCLOSURE

Field of the Disclosure

The present disclosure relates to a driving mechanism, and more particularly to an optical element driving mechanism.

Description of the Related Art

As technology has developed, many electronic devices (such as tablet computers and smartphones) are equipped with optical element driving mechanisms. One or more optical elements driven by the optical element driving mechanisms can capture images and record videos.

In general, an optical element driving mechanism may include a case, a holder, a magnet, a coil, a printed circuit board, and a bottom. These elements are stacked together. However, the overall height of the optical element driving mechanism is increased because of the arrangement of these elements. Additionally, the trend in electronic devices is toward miniaturization, and especially reductions in the height of electronic devices. This is done for convenience. That is, the height of optical element driving mechanisms installed in electronic devices has to be reduced as well.

Therefore, how to reduce the height of an optical element driving mechanism is a topic worth exploring and a problem worth solving.

BRIEF SUMMARY OF THE DISCLOSURE

According to some embodiments of the disclosure, an optical element driving mechanism is provided. The optical element driving mechanism includes a fixed part, a movable part, a first driving assembly, and a strengthening member. The fixed part includes a first base. The movable part is connected to an optical element with an optical axis. The movable part is movable relative to the fixed part, and the movable part is accommodated in the fixed part. The first driving assembly drives the movable part to move relative to the fixed part. The first driving assembly is disposed in the first base. The strengthening member is embedded in the first base. When viewed along a direction that is perpendicular to the optical axis, the strengthening member at least partially overlaps the first driving assembly. When viewed along the optical axis, the strengthening member does not overlap the first driving assembly.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIGS. 7A-7E are flow charts of the process of manufacturing the bottom unit.

DETAILED DESCRIPTION OF THE DISCLOSURE

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, such that the first and second features may not be in direct contact. The ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of this disclosure are described with the drawings.

Figure 1:
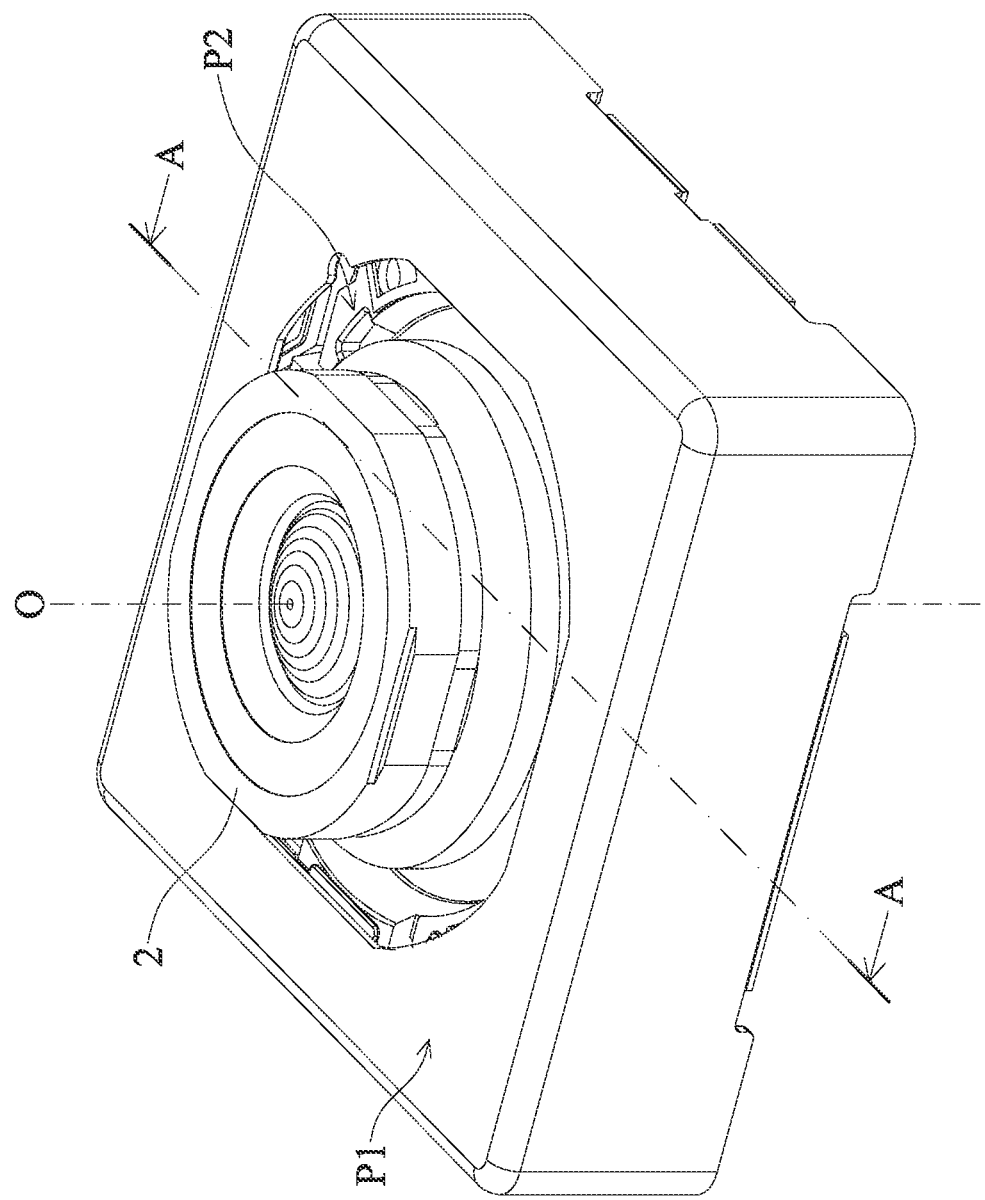
FIG. 1 is a perspective view of an optical element driving mechanism and an optical element in accordance with some embodiments of this disclosure.
Figure 2A:
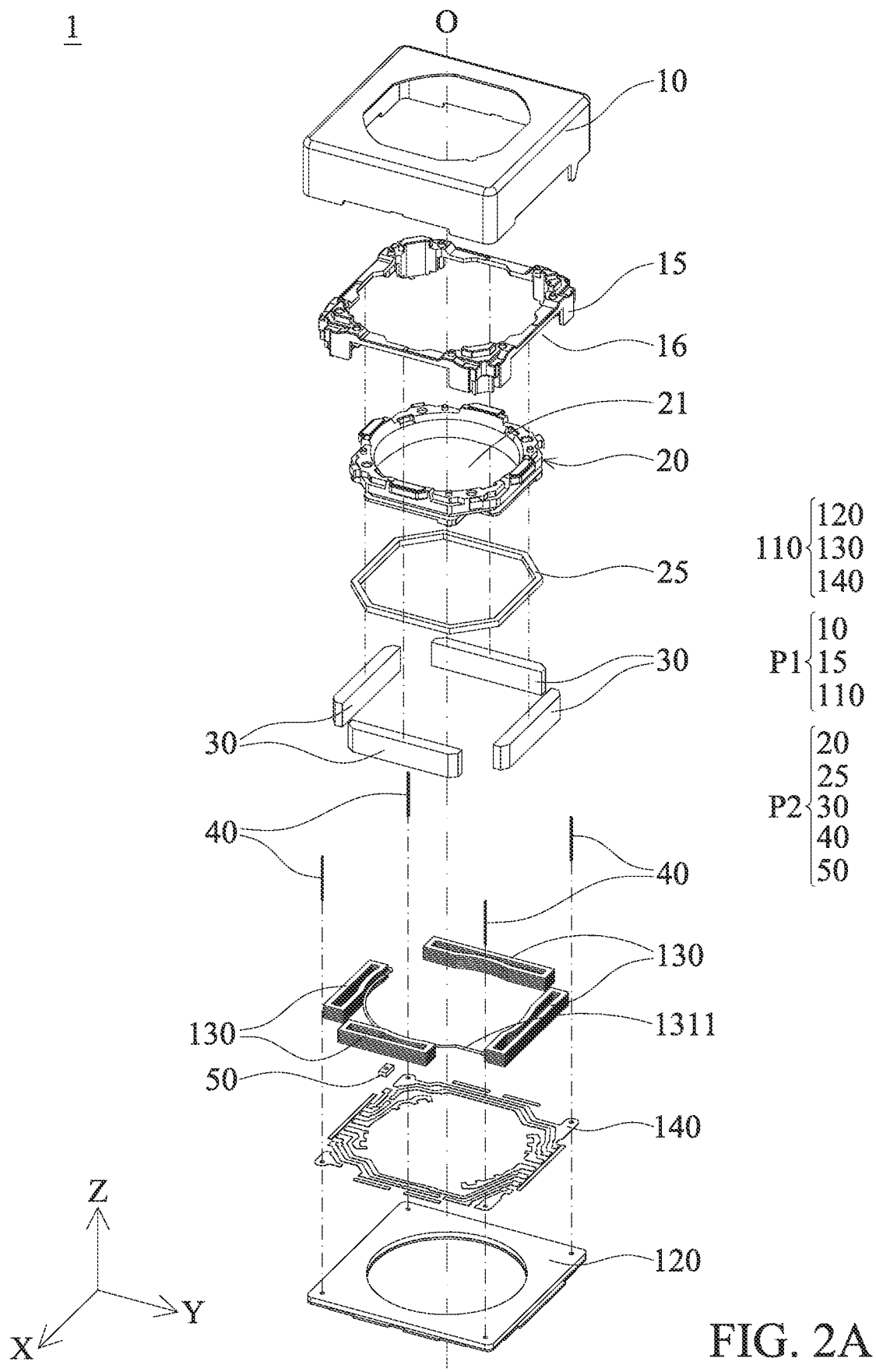
FIG. 2A is an exploded view of the optical element driving mechanism in FIG. 1.

FIG. 1 is a perspective view of an optical element driving mechanism 1 and an optical element 2 in accordance with some embodiments of this disclosure. FIG. 2A is an exploded view of the optical element driving mechanism 1 in FIG. 1. The optical element driving mechanism 1 includes a fixed part P1 and a movable part P2. The movable part P2 moves relative to the fixed part P1 and holds the optical element 2 with an optical axis O. The optical axis O is defined as a virtual axis passing through the center of the optical element 2.

It should be noted that when the optical element 2, the optical element driving mechanism 1, and a photosensitive element (not shown, such as a coupling photosensitive detector, CCD) are aligned, the optical axis O of the optical element 2 also passes through the center of the optical element driving mechanism 1. Even the optical element 2 is not illustrated in some drawings, the optical axis O is still illustrated for clear illustration such as the features related to the optical element driving mechanism 1.

In this embodiment, the fixed part P1 includes a case 10, a frame 15, and a bottom unit 110 which is integrally formed. The movable part P2 includes a holder 20, a coil 25, four magnetic elements 30, four elastic elements 40, and an electronic element 50. The elements or components may be added or deleted according to requirements.

The case 10, the frame 15, and the bottom unit 110 of the fixed part P1 are arranged along the optical axis O. The case 10 is located above the frame 15 and the bottom unit 110. The methods for connecting the case 10 and the bottom unit 110 may be engagement, welding, or using a conductive resin material, etc. Other elements of the optical element driving mechanism 1, such as the movable part P2, may be accommodated in the space formed by the combination of the case 10 and the bottom 110. The frame 15 includes four receiving holes 16 for receiving the four magnetic elements 30.

The holder 20 of the movable part P2 includes a hole 21 to hold the optical element 2. A screw and corresponding threaded structure may be configured between the hole 21 and the optical element 2, so that the optical element 2 may be affixed in the holder 20 better.

The holder 20 is not in direct contact with the case 10. The holder 20 is not in direct contact with the bottom unit 110, either. In some embodiments, the holder 20 is held by one or more springs (not shown) elastically to restrict the range of movement of the holder 20. Therefore, when the optical element driving mechanism 1 moves or is impacted by the environment, the holder 20 and the optical element 2 therein are not damaged by colliding with the case 10 or the bottom unit 110.

Figure 2B:
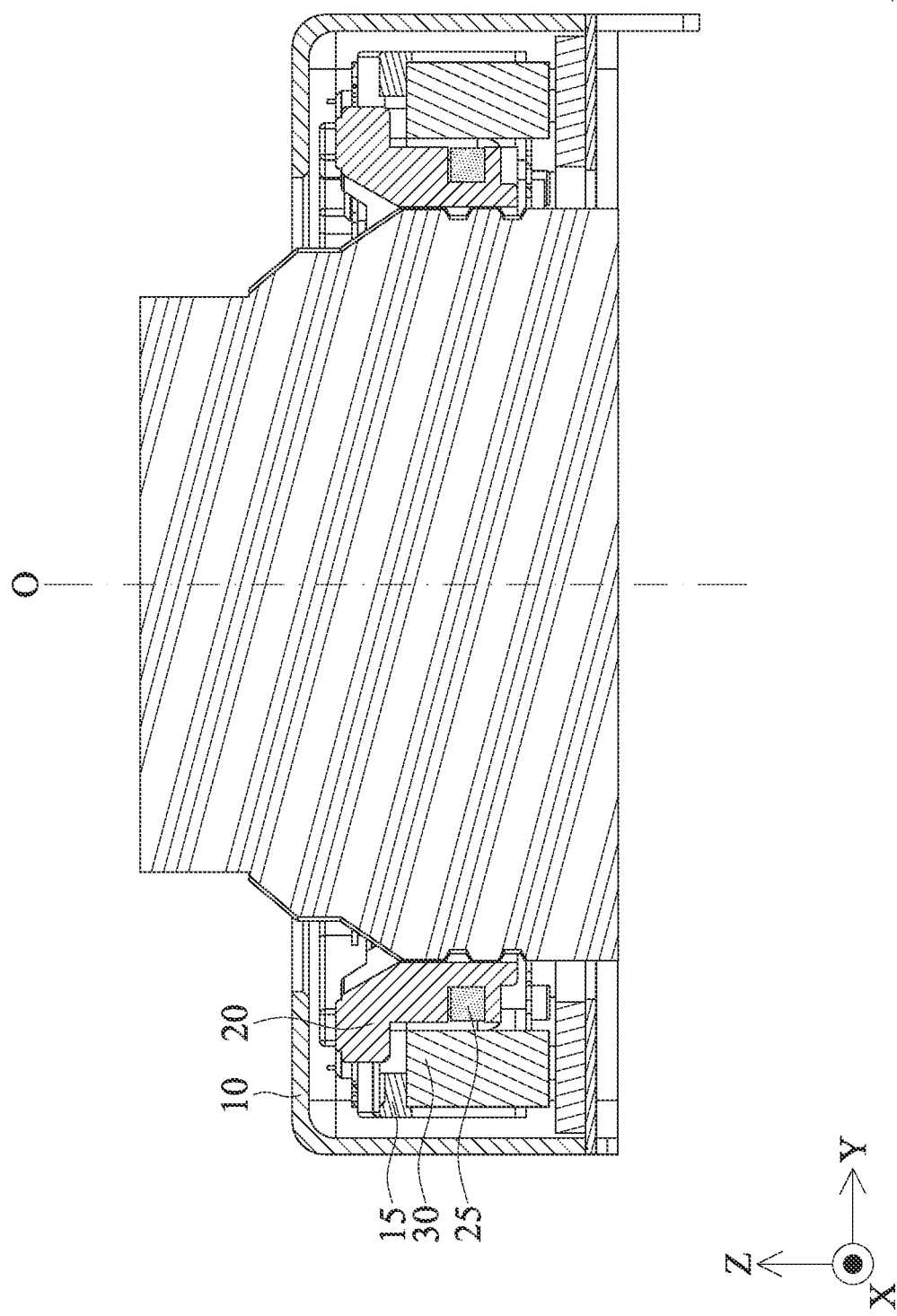
FIG. 2B is a cross-sectional view illustrated along line A-A in FIG. 1.

The coil 25 surrounds the holder 20, and the coil 25 is polygonal. Please refer to FIG. 2B to understand the configuration of the coil 25 and the magnetic element 30. FIG. 2B is a cross-sectional view illustrated along line A-A in FIG. 1. As shown in FIG. 2B, when a current is applied to the coil 25, a magnetic force is generated between the coil 25 and the magnetic element 30 to drive the holder 20 and the optical element 2 therein to move along a direction that is parallel to the optical axis O, thereby achieving auto focus (AF).

The positions of the four magnetic elements 30 correspond to the position of the driving coil assembly 130. When a current is applied to the driving coil assembly 130, a magnetic force is generated between the driving coil assembly 130 and the corresponding magnetic element 30 to drive the holder 20 and the optical element 2 therein to move along a direction that is perpendicular to the optical axis O, thereby achieving optical image stabilization (OIS).

The movable part P1 and the fixed part P2 are elastically connected by the four elastic elements 40. The four elastic elements 40 are respectively disposed at the four corners of the bottom unit 110. The elastic elements 40 have long strip-shaped structures, for example, columnar or linear, but are not limited thereto.

The electronic element 50 is disposed in the bottom unit 110, so that space may be saved and miniaturization is achieved. The electronic element 50 may be a sensing element, a passive element, a driving integrated circuit (IC), such as capacitors, resistors, inductors, or a chip this is not packaged.

In other embodiments of this disclosure, the movable part P2 further includes a sensed object and a sensor (not shown). The sensed objected is disposed close to the holder 20, and the position of the sensor corresponds to the position of the sensed object. The sensed object may be a magnetic element, such as a magnet. The sensor may be a giant magnetoresistive effect sensor (GMR sensor), a tunneling magnetoresistive effect sensor (TMR sensor), etc. When the holder 20 moves, the sensed object near the holder 20 moves as well, and the magnetic field of the sensed object changes. Additionally, the change of the magnetic field of the sensed object is detected by the sensor. Therefore, the position of the holder 20 may be known. Furthermore, the position adjustment and the displacement control of the holder 20 may be conducted.

Figure 3:
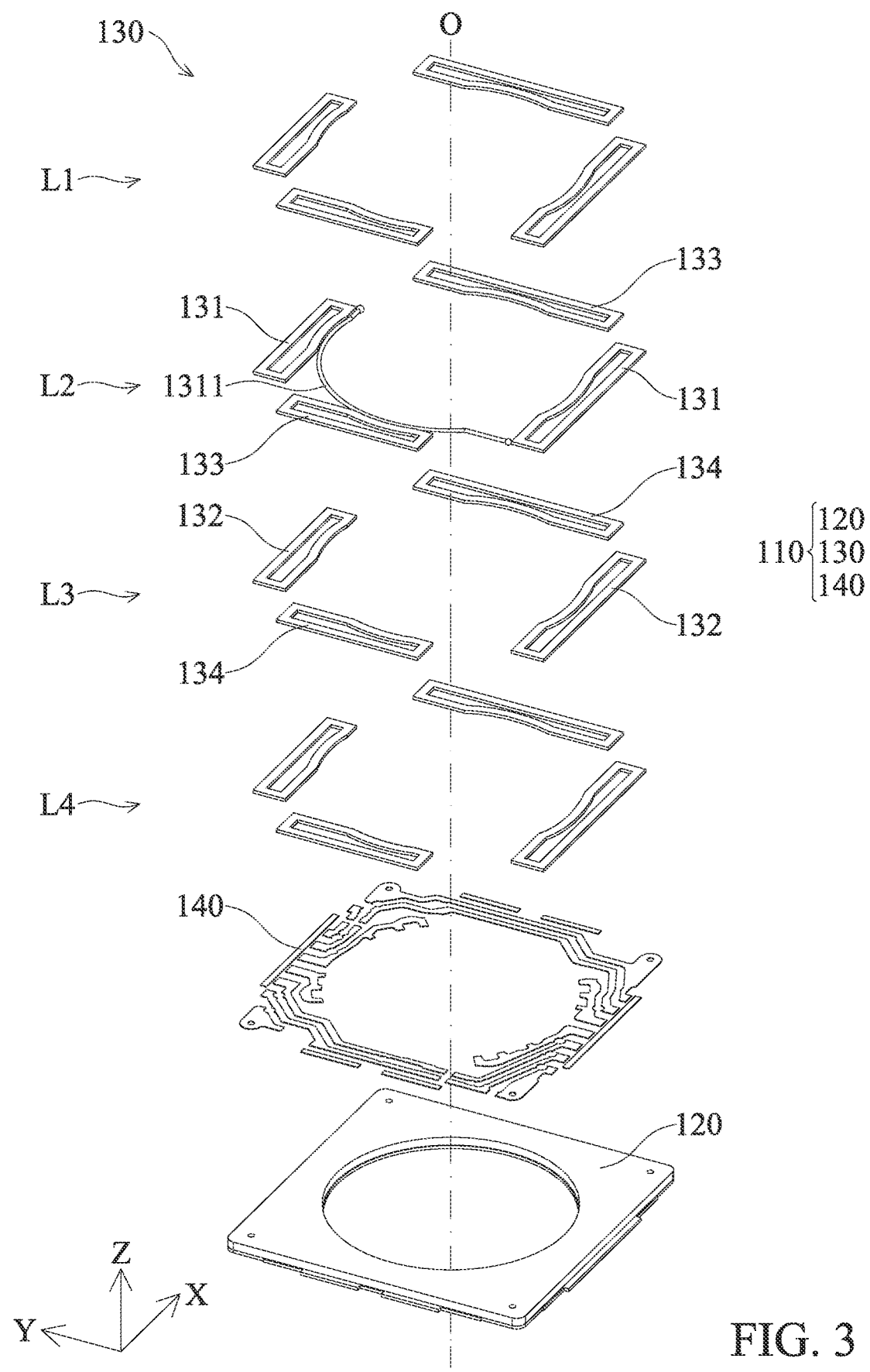
FIG. 3 is an exploded view of a bottom unit.
Figure 4:
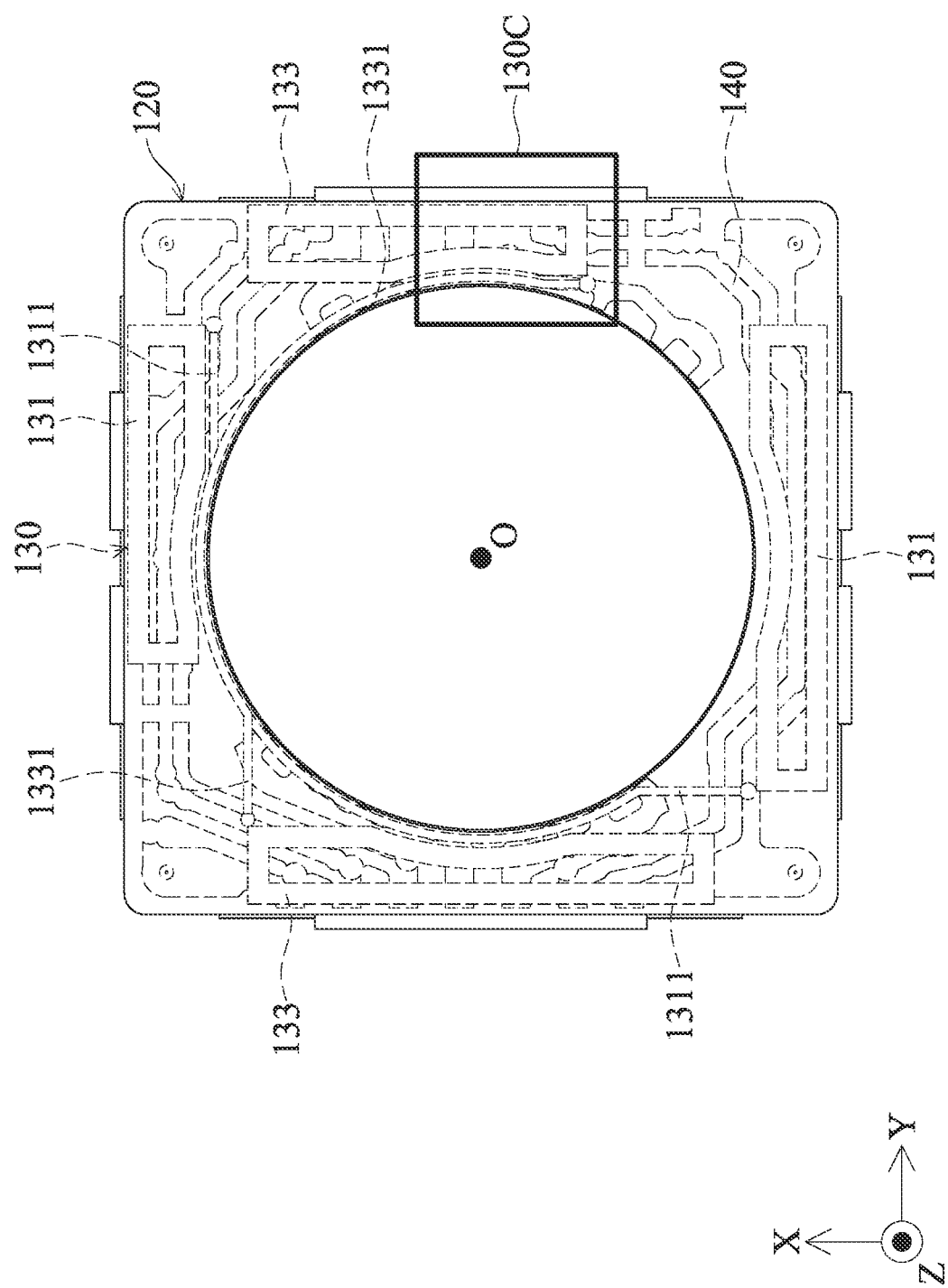
FIG. 4 is a top view of the bottom unit.

Next, please refer to FIG. 3 and FIG. 4 to clearly understand the configuration of the bottom unit 110 which is integrally formed. FIG. 3 is an exploded view of the bottom unit 110. FIG. 4 is a top view of the bottom unit 110.

The bottom unit 110 includes a base member 120, a driving coil assembly 130, and a circuit member 140. The driving coil assembly 130 is electrically connected to the circuit member 140. The driving coil assembly 130 and the circuit member 140 are located at the base member 120, so that the bottom unit 110 is integrally formed.

It should be noted that the term "integrally formed" as used herein does not mean that the base member 120, the driving coil assembly 130, and the circuit member 140 are inseparably made of the same material. The term "integrally formed" as used herein means that after the bottom unit 110 is manufactured, the base member 120, the driving coil assembly 130, and the circuit member 140 of the bottom unit 110 are physically connected. The base member 120, the driving coil assembly 130, and the circuit member 140 of the bottom unit 110 do not need to be assembled. Thus, the bottom unit 110 is defined as "integrally formed". There is no need to connect the base member 120, the driving coil assembly 130, and the circuit member 140 of the bottom unit 110 by adhesion, welding, etc. Therefore, the process may be simplified, the complexity of manufacturing may be reduced, and/or the production cost may be decreased.

The "height" of the element as described herein is defined as the length of the element that is parallel to the optical axis O for clear illustration. The demand for a thinner electronic device is increasing, and thus the height of the optical element driving mechanism 1 installed in the electronic device has to be reduced as well.

In general, the driving coil assembly may be embedded in the circuit board. The circuit board and the bottom have to be connected by adhesion or welding, and the sum of the height of the circuit board and the bottom is about 0.85 mm. The height of the bottom unit is difficult to be reduced in such a situation because each of the elements has its minimum height limit. In this disclosure, the driving coil assembly 130 and the circuit member 140 are located at the base member 120, and the height of the integrally formed bottom unit 110 is about 0.5 mm. The overall height of the optical element driving mechanism 1 is significantly reduced, and the optical element driving mechanism 1 may be thinner.

The driving coil assembly 130 has a plurality of turns. A single wire or multiple wires are wound in the same winding layer to form turns. After enough turns are formed in the same winding layer, other turns are wound in the next winding layer. Thus, multiple winding layers are formed. According to different designs or requirements, the driving coil assembly 130 may have a different number of winding layers. The winding layers are usually even numbers, such as four layers or eight layers, but are not limited hereto. As shown in FIG. 3, in this embodiment, the driving coil assembly 130 has four winding layers which are sequentially arranged along a direction that is parallel to the optical axis O, including a first winding layer L1, a second winding layer L2, a third winding layer L3, and a fourth winding layer L4. The wires connecting the first winding layer L1, the second winding layer L2, the third winding layer L3, and the fourth winding layer L4 are not shown.

The driving coil assembly 130 includes two first driving coils 131, two second driving coils 132, two third driving coils 133, two fourth driving coils 134, a connection wire 1311, and another connection wire 1331. The first driving coils 131 are connected to each other via the connection wire 1311, and the third driving coils 133 are connected to each other via the connection wire 1331. It should be noted that, in FIG. 2A and FIG. 3, the connection wire 1331 is not shown in order to illustrate the connection wire 1311 clearly. The first driving coils 131 and the third driving coils 133 are located at the second winding layer L2. The second driving coils 132 and the fourth driving coils 134 are located at the third winding layer L3. Therefore, when viewed in a direction that is perpendicular to the optical axis O, the third driving coils 133 partially overlap the first driving coils 131, and the fourth driving coils 134 partially overlap the second driving coils 132.

As mentioned above, the driving coil assembly 130 drives the movable part P2 to move along a direction that is perpendicular to the optical axis O. More specifically, the first driving coils 131 and the second driving coils 132 located on opposite sides drive the movable part P2 to move along the X-axis. In contrast, the third driving coils 133 and the fourth driving coils 134 located on opposite sides drive the movable part P2 to move along the Y-axis.

As shown in FIG. 4, the profile of the driving coil assembly 130 is substantially rectangle-shaped. In other embodiments, the profile of the driving coil assembly 130 is shaped substantially like an ellipse. The driving coil assembly 130 is provided with a concave portion 130C located at a position that is close to the optical element 2. Therefore, the accommodation space for the optical element 2 may be increased, and a larger optical element 2 may be installed in the optical element driving mechanism 1. The optical element driving mechanism 1 may be more practical.

In the following text, only the structures and the configurations regarding the first driving coils 131 and the second driving coils 132 are described. It should be understood that the third driving coils 133 and the fourth driving coils 134 also have similar structures and configurations.

Figure 5:
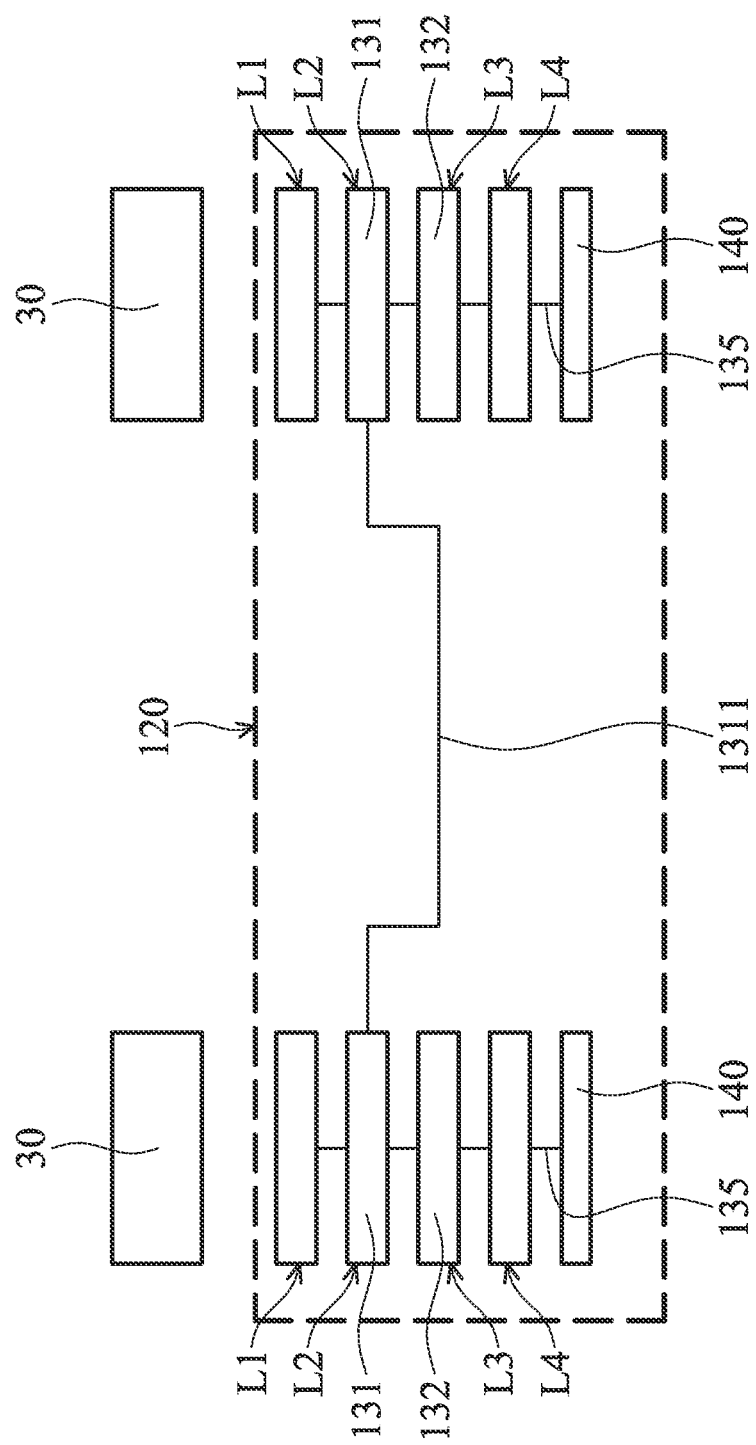
FIG. 5 is a schematic view of the bottom unit in a cross-sectional view.

FIG. 5 is a schematic view of the bottom unit 110 in a cross-sectional view. For simplicity, the connection wire 1311 and the first driving coils 131 are drawn to be located on the same plane in FIG. 2A and FIG. 3. However, in fact, as shown in FIG. 5, a portion of the connection wire 1311 (the middle of the connection wire 1311 which is not adjacent to the first driving coils 131) is disposed at a side away from the magnetic element 30. When viewed along a direction that is perpendicular to the optical axis O, the second driving coils 132 partially overlap the connection wire 1311. This configuration may reduce magnetic interference and enhance the magnetic driving force. Additionally, the connection wire 1311 is taken out from the first driving coils 131, so the number of turns in each of the first driving coils 131 is different than the number of turns in each of the second driving coils 132.

It should be clarified that the first driving coils 131 and the third driving coils 133 are not limited to be located at the second winding layer L2. Similarly, the second driving coils 132 and the fourth driving coils 134 are not limited to be located at the third winding layer L3. Except for the winding layer that is closest to or farthest from the magnetic element 30, the first driving coils 131 may be located at any of the other winding layers.

The magnetic force is inversely proportional to the square of the distance. Compared to the other winding layers, the maximal magnetic driving force is generated in the winding layer of the driving coil assembly 130 that is closest to the magnetic element 30 (for example, the first winding layer L1 in this embodiment). To assure that the number of turns in the winding layer that is closest to the magnetic element 30 is enough for generating the maximal magnetic force, normally no wire is taken out from the winding layer that is closest to the magnetic element 30. Therefore, the first driving coils 131 with the connection wire 1311 taken out are not located in the winding layer that is closest to the magnetic element 30 normally. The number of turns in the winding layer that is closest to the magnetic element 30 may be assured. Additionally, a portion of the connection wire 1311 is disposed at a side away from the magnetic element 30 to reduce the magnetic interference, so the first driving coils 131 are not located at the winding layer that is farthest from the magnetic element 30 (for example, the fourth winding layer L4 in this embodiment) normally.

To sum up, as long as the second driving coils 132 are located between the first driving coils 131 and the circuit member 140, and the fourth driving coils 134 are located between the third driving coils 133 and the circuit member 140, such a situation falls into the scope of this disclosure. Take an optical element driving mechanism with eight winding layers as an example, the first driving coils 131 with the connection wire 1311 taken out may be located at the third winding layer, and the second driving coils 132 may be located at the fifth winding layer. Alternatively, the first driving coils 131 with the connection wire 1311 taken out ay be located at the fourth winding layer, and the second driving coils 132 may be located at the seventh winding layer. Additionally, in various embodiments, the second driving coils 132 partially overlap the connection wire 1311.

It should be noted that the resistance of the wire is inversely proportional to the width of the wire. To reduce the resistance and enhance the structural strength of the wire, the width of the connection wire 1311 may be designed to be greater than the width of the wire of the first driving coils 131 during the process of manufacturing the bottom unit 110. Compared to the first driving coils 131, there are fewer elements around the connection wire 1311. The connection wire 1311 is strengthened to make sure the optical element driving mechanism 1 may be operated normally.

The driving coil assembly 130 and the circuit member 140 are electrically connected at an electrical connection point 135. The electrical connection point 135 is located at the base member 120 and is not exposed from the bottom unit 110. Additionally, the driving coil assembly 130 is a multi-layer structure. The size of the driving coil assembly 130 is greater than the size of the circuit member 140 in a direction that is parallel to the optical axis O.

Figure 6:
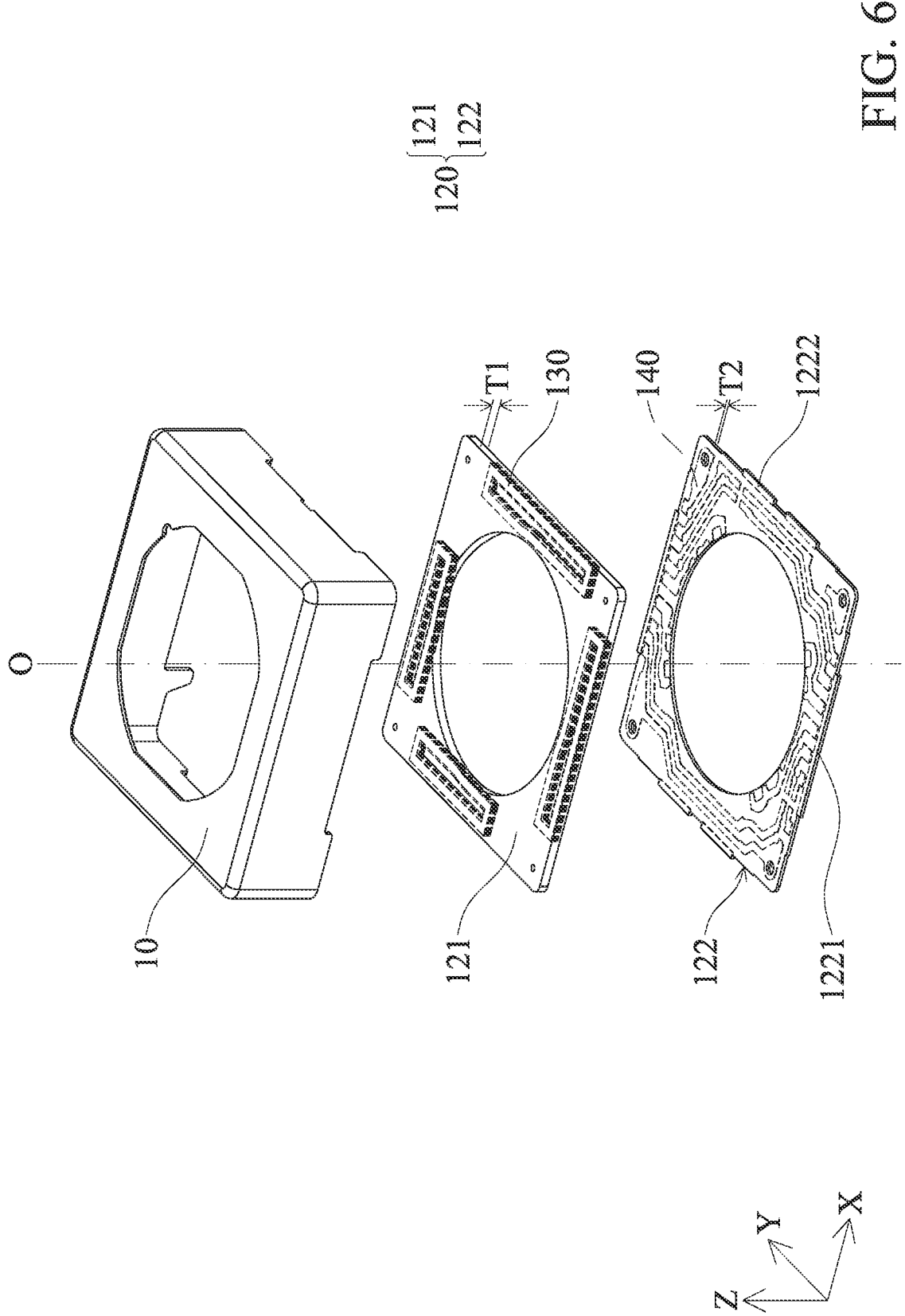
FIG. 6 is an exploded view of a case and a base member.

FIG. 6 is an exploded view of the case 10 and the base member 120. The base member 120 includes a first base 121 and a second base 122. The first base 121 is formed on the second base 122. The second base 122 includes a support surface 1221, and the bottom unit 110 is connected to the case 10 at the support surface 1221. The support surface 1221 has a metal layer 1222.

As shown in FIG. 6, the driving coil assembly 130 is located at the first base 121, and the circuit member 140 is located at the second base 122. Since the size of the driving coil assembly 130 is greater than the size of the circuit member 140 in a direction that is parallel to the optical axis O, the size T1 of the first base 121 is also greater than the size T2 of the second base 122. The driving coil assembly 130 is covered by the first base 121, so that the driving coil assembly 130 is protected by the first base 121. Similarly, the circuit member 140 may be protected by the second base 122. This configuration may be changed. For example, the driving coil assembly 130 may be located at the second base 122, the circuit member 140 may be located at the first base 121, and the size of the second base 122 is greater than the size of the first base 121.

The hardness of the first base 121 and the second base 122 may be the same or different. For example, when the hardness of the first base 121 is greater than the hardness of the second base 122, it's beneficial for the bendability of the second base 122 and the circuit member 140 covered by the second base 122. When the hardness of the first base 121 is less than the hardness of the second base 122, the structural strength of the first base 121 disposed on the second base 122 may be enhanced. Therefore, depending on requirements, the base member 120 may be designed to satisfy the mechanical strength or bendability in order to strengthen the structure of the optical element driving mechanism 1.

It should be emphasized that the first base 121 and the second base 122 are manufactured at different stages in the manufacturing process, so that the first base 121 and the second base 122 may be made of different materials. FIGS. 7A-7E are flow charts of the process of manufacturing the bottom unit 110. From the description, a person having ordinary skill in the art may be able to understand how the bottom unit 110 of this disclosure is integrally formed without requiring further assembly.

FIG. 7A illustrates a substrate 115. FIG. 7B illustrates the substrate 115 with the predetermined circuit structures after such processes as dielectric material D deposition, circuit layer (for example, copper) deposition, exposure, development, and etching. The predetermined circuit structure formed in FIG. 7B is the first winding layer L1 of the driving coil assembly 130. Next, the processes of dielectric material D deposition, circuit layer deposition, exposure, development, etching are repeated several times to obtain different predetermined circuit structures (i.e., the second winding layer L2, the third winding layer L3, the fourth winding layer L4). The first base 121 is formed by dielectric material D deposition. After the first base 121 is formed, the circuit member 140 is formed on the first base 121. FIG. 7C illustrates the substrate 115, the first base 121, and the circuit member 140. As shown in FIG. 7C, the first winding layer L1, the second winding layer L2, the third winding layer L3, and the fourth winding layer L4 are covered by the first base 121.

Next, the electronic element 50 is mounted on the circuit member 140, and the deposition of the second base 122 is carried out. FIG. 7D illustrates the bottom unit 110 after the deposition of the second base 122 is accomplished. It should be noted that the circuit member 140 is formed at the interface of the first base 121 and the second base 122. The substrate 115 is then removed, a first perforation 411 and a second perforation 412 are cut out, and the metal layer 1222 is formed. The bottom unit 110 is then placed upside down. FIG. 7E illustrates the bottom unit 110 after the manufacturing process. The contents of the first perforation 411, the second perforation 412, and the metal layer 1222 are described in detail below.

The area and the position of the support surface 1221 are not limited to the embodiment shown in FIG. 6. For example, when viewed in a direction that is parallel to the optical axis O, the first base 121 may be continuously surrounded by the support surface 1221. Therefore, when the case 10 is connected to bottom unit 110 at the support surface 1221, the first base 121 is completely surrounded by the case 10, thereby reducing the possibility of matter or dust entering the optical element driving mechanism 1. Alternatively, the shape of the first base 121 may be adjusted. For example, the four corners of the first base 121 may be reduced inwardly by a distance, so that the case 10 may be easier to be connected to the bottom unit 110 at the support surface 1221.

The support surface 1221 and the bottom unit 110 may be strengthened by the metal layer 1222. From the description of FIGS. 7A-7E, the deposition of the metal layer 1222 and the circuit member 140 are simultaneously conducted. Therefore, when viewed along a direction that is perpendicular to the optical axis O, the metal layer 1222 partially overlaps the circuit member 140. Additionally, the metal layer 1222 may be simultaneously deposited with any of the winding layers of the driving coil assembly 130 at the same step. In such a situation, the metal layer 1222 partially overlaps the driving coil assembly 130. The manufacturing process may be simplified by simultaneously depositing the metal layer 1222 and the circuit member 140 or simultaneously depositing the metal layer 1222 and any of the winding layers of the driving coil assembly 130. The production efficiency of the bottom unit 110 is increased. Miniaturization of the bottom unit 110 and the optical element driving mechanism 1 in a direction that is parallel to the optical axis O is achieved.

Figure 8:
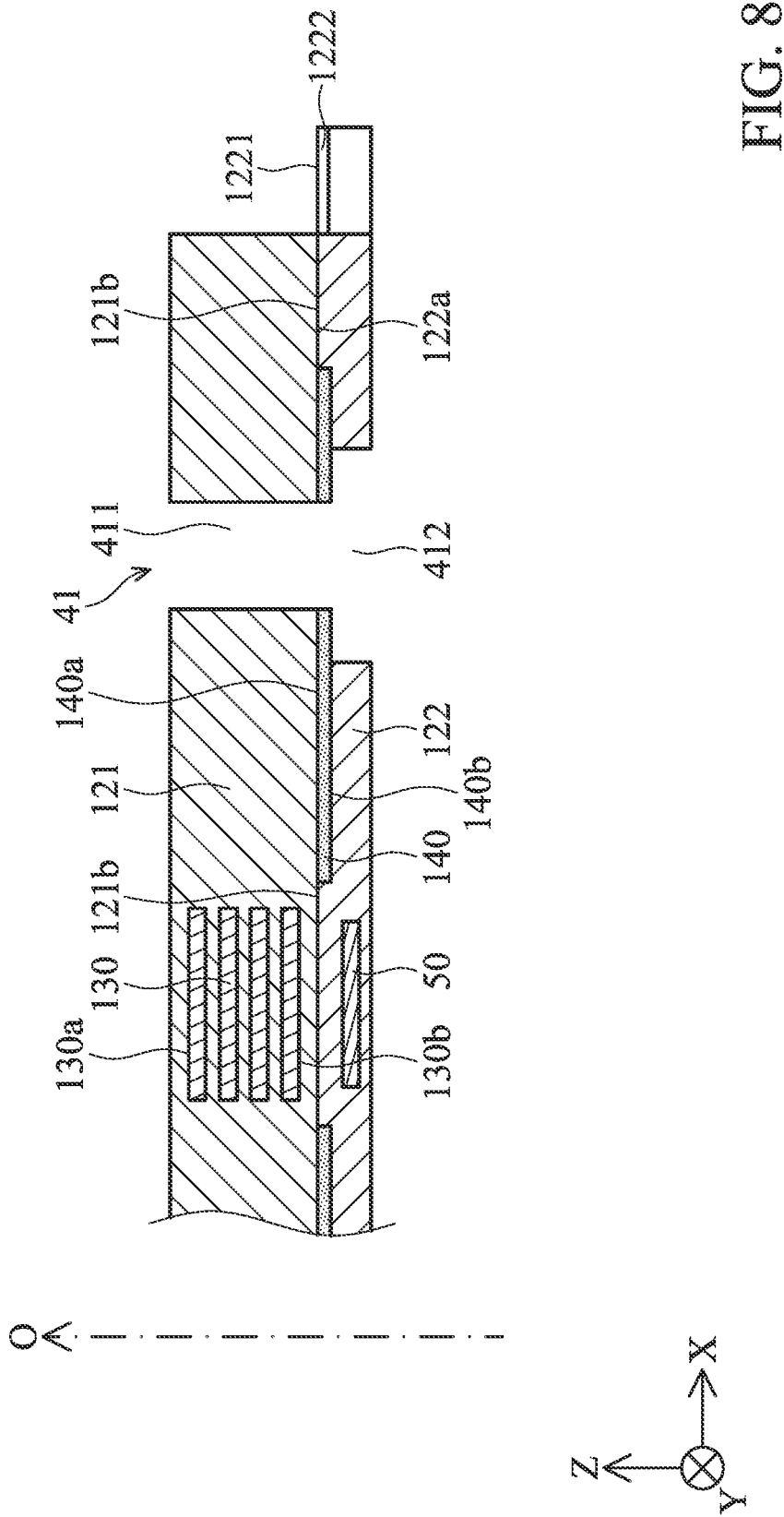
FIG. 8 is a configuration of the bottom unit and an electronic element in a cross-sectional view.

FIG. 8 is a configuration of the bottom unit 110 and the electronic element 50 in a cross-sectional view, and FIG. 8 is simplified from FIG. 7E. In this embodiment, the electronic element 50 is located at the second base 122, and the electronic element 50 may be completely embedded in the second base 122 and not exposed from the bottom unit 110, so that the electronic element 50 may be protected. Since the size of the driving coil assembly 130 located at the first base 121 is not affected or restricted by the electronic element 50 located at the second base 122, the size of the driving coil assembly 130 may be adjusted to make sure that the magnetic force is enough for driving the optical element driving mechanism 1.

The circuit member 140 is located at the second base 122. More specifically, the circuit member 140 is in contact with the interface of the first base 121 and the second base 122. A portion of the circuit member 140 is disposed between the driving coil assembly 130 and the electronic element 50. The top surface 140*a* of the circuit member 140 is in contact with the bottom surface 121*b* of the first base 121, and the bottom surface 140*b* of the circuit member 140 is in contact with the second base 122. The top surface 140*a* is parallel to the bottom surface 140*b*. Additionally, the top surface 140*a* of the circuit member 140 and the top surface 122*a* of the second base 122 are in contact with the bottom surface 121*b* of the first base 121.

In other embodiments of this disclosure, the circuit member 140 is located at the first base 121 and is in contact with the interface of the first base 121 and the second base 122. In such a situation, the bottom surface 140*b* of the circuit member 140 and the bottom surface 121*h* of the first base 121 are in contact with the top surface 122*a* of the second base 122.

Figure 9:
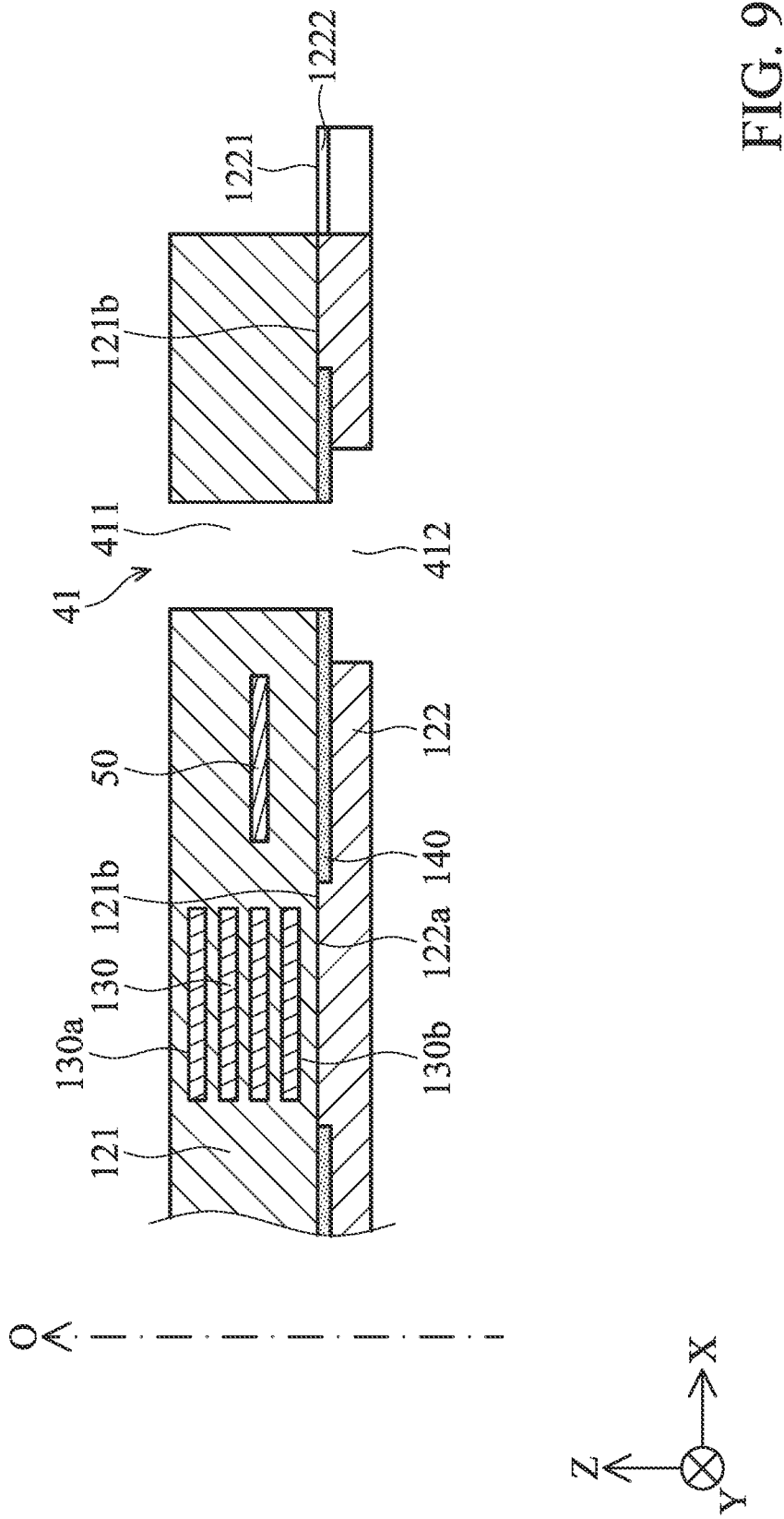
FIG. 9 is a configuration of the bottom unit and the electronic element in a cross-sectional view.

FIG. 9 is a configuration of the bottom unit 110 and the electronic element 50 in a cross-sectional view according to some embodiments of this disclosure. In this embodiment, the electronic element 50 is located at the first base 121. When viewed along a direction that is perpendicular to the optical axis O, the driving coil assembly 130 partially overlaps the electronic element 50. Additionally, the electronic element 50 may be completely embedded in the first base 121 and not exposed from the bottom unit 110, so that the electronic element 50 may be protected.

In this embodiment, the driving coil assembly 130 is located at the first base 121. In some embodiments, the driving coil assembly 130 may be in contact with the interface of the first base 121 and the second base 122. In such a situation, the top surface 130*a* of the driving coil assembly 130 is in contact with the first base 121, and the bottom surface 130*b* of the driving coil assembly 130 is in contact with the top surface 122*a* of the second base 122. The top surface 130*a* is parallel to the bottom surface 130*b*. Additionally, the bottom surface 130 of the driving coil assembly 130 and the bottom surface 121*b* of the first base 121 are in contact with the top surface 122*a* of the second base 122.

In other embodiments of this disclosure, the driving coil assembly 130 is located at the second base 122 and in contact with the interface of the first base 121 and the second base 122. In such a situation, the top surface 130*a* of the driving coil assembly 130 and the top surface 122*a* of the second base 122 are in contact with the bottom surface 121*b* of the first base 121.

To sum up, since the circuit member 140 or the driving coil assembly 130 is located at the interface of the first base 121 and the second base 122, no additional space is required to accommodate the circuit member 140 or the driving coil assembly 130. The processes may be simplified and miniaturization may be achieved.

Figure 10:
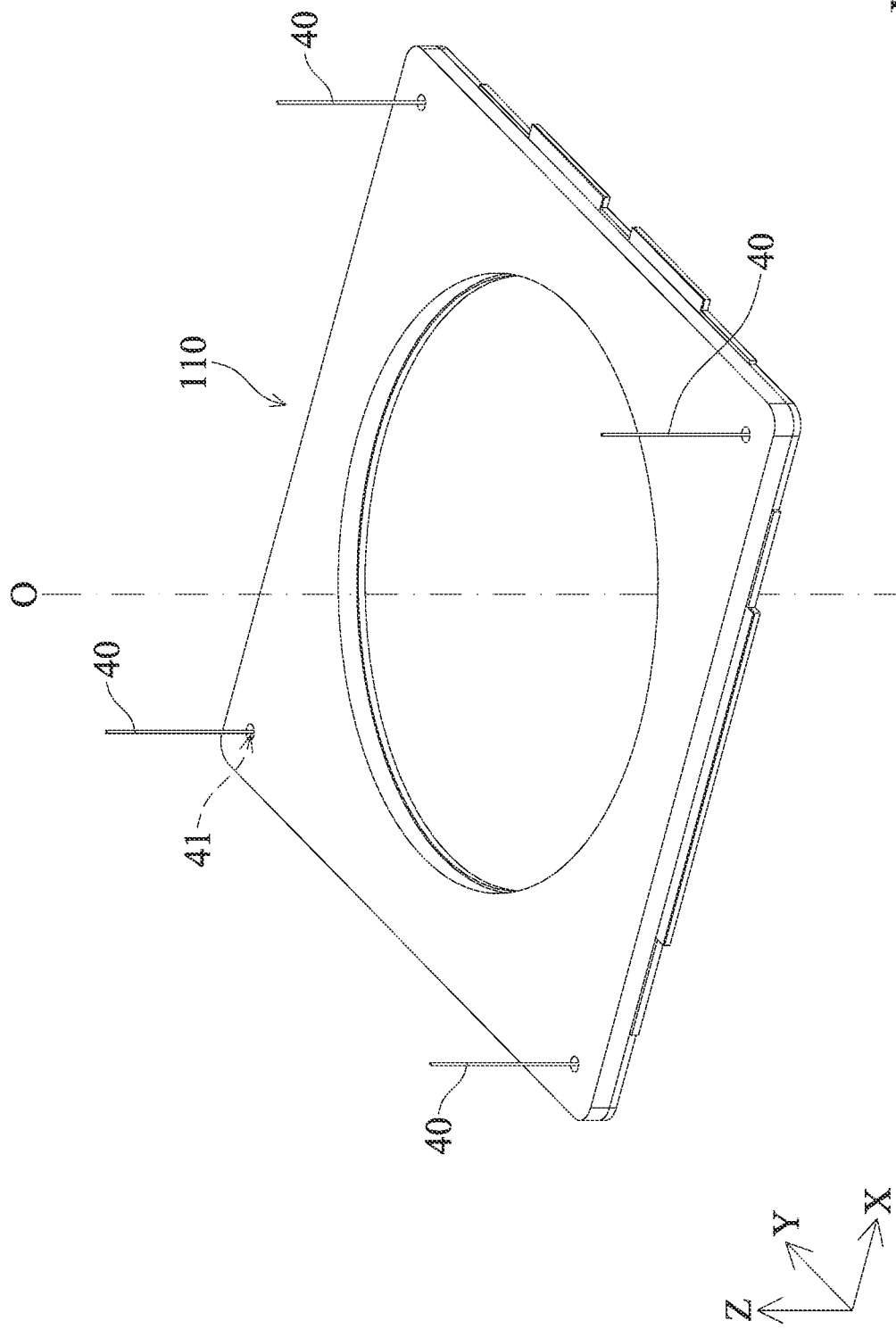
FIG. 10 is a perspective view of the bottom unit and an elastic element.

FIG. 10 is a perspective view of the bottom unit 110 and the elastic element 40. The bottom unit 110 has four elastic element connection portions 41. The elastic element 40 passes through the elastic element connection portion 41. The elastic element 40 is electrically connected to the elastic element connection portion 41. Therefore, no additional wires are required to be disposed at the end of the elastic element 40. The configuration of the circuit structure may be simplified. Additionally, the body of the elastic element 40 has a longer extendable or shortened portion.

Figure 11:
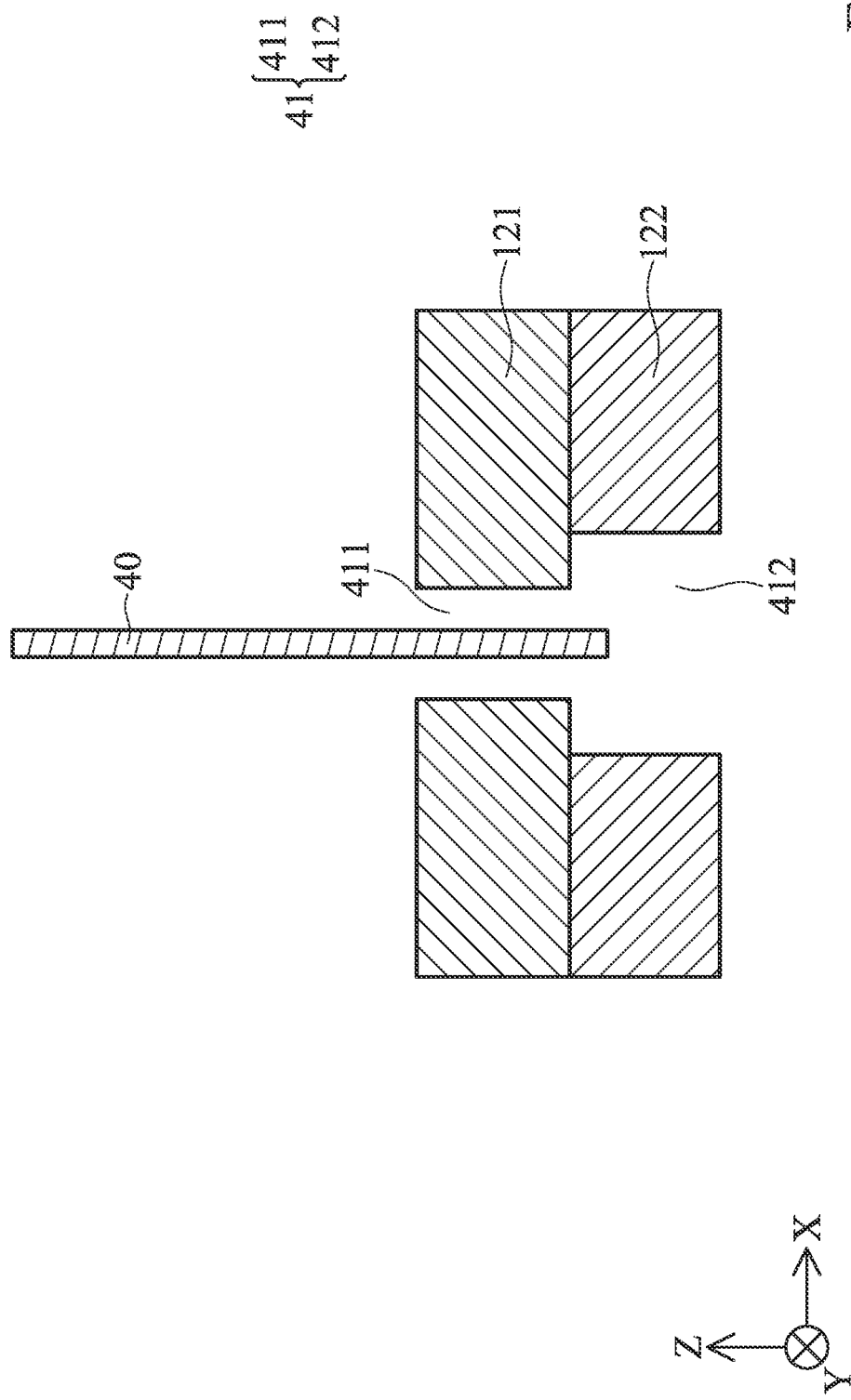
FIG. 11 is a schematic view of an elastic element connection portion in a cross-sectional view.

FIG. 11 is a schematic view of the elastic element connection portion 41 in a cross-sectional view. The elastic element connection portion 41 includes the first perforation 411 and the second perforation 412. The first perforation 411 is closer to the movable part P2 than the second perforation 412. The size of the first perforation 411 is different than that of the second perforation 412. In this embodiment, since the elastic element 40 is electrically connected to the elastic element connection portion 41 by welding or the like at the second perforation 412, the first perforation 411 is smaller than the second perforation 412. Therefore, it's advantageous for the elastic element 40 to be connected to the bottom unit 110. The assembling efficiency of the elastic element 40 may be enhanced.

To protect the elastic element connection portion 41 from oxidation and to enhance the durability of the elastic element connection portion 41, a first plated layer (not shown) and a second plated layer (not shown) may be plated on the elastic element connection portion 41. The second plated layer is plated over the first plated layer, so that the first plated layer is located between the elastic element connection portion 41 and the second plated layer. The second plated layer may be made of a metal material which is unlikely to be oxidized. For example, the first plated layer may include nickel (Ni), and the second plated layer may include gold (Au). The elastic element 40 may be electrically connected to the elastic element connection portion 41 via the first plated layer and the second plated layer.

Figure 12:
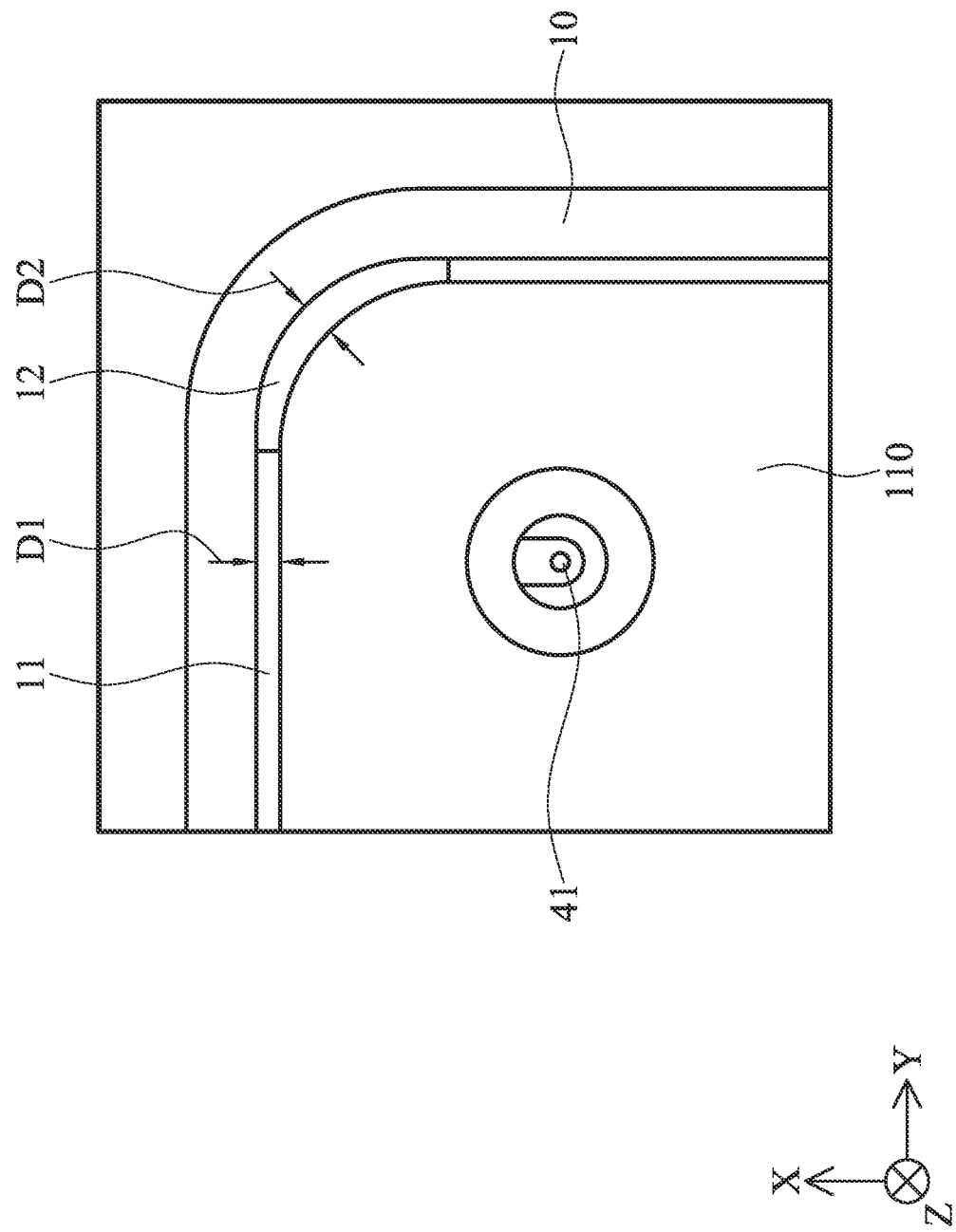
FIG. 12 is a bottom view of a portion of the optical element driving mechanism.

FIG. 12 is a bottom view of a portion of the optical element driving mechanism 1, in which the case 10 is connected to the bottom unit 110. FIG. 12 illustrates one of the four corners of the optical element driving mechanism 1. In each corner, two straight line portions 11 and a curved line portion 12 are formed in the space between the case 10 and the bottom unit 110. The straight line portions 11 are connected via the curved line portion 12. As shown in FIG. 12, the width D2 of the curved line portion 12 is greater than the width D1 of the straight line portion 11. It should be noted that the size of the corners of the optical element driving mechanism 1 is not easy to control. When the case 10 is connected to the bottom unit 110, the deviation of assembling may possibly occur. By such design, the deviation of assembling may be prevented. Furthermore, an adhesive may be filled into the straight line portion 11 and/or the curved line portion 12, as needed, to increase the structural strength of the optical element driving mechanism 1 and to reduce the possibility of matter or dust entering the optical element driving mechanism 1.

Figure 13:
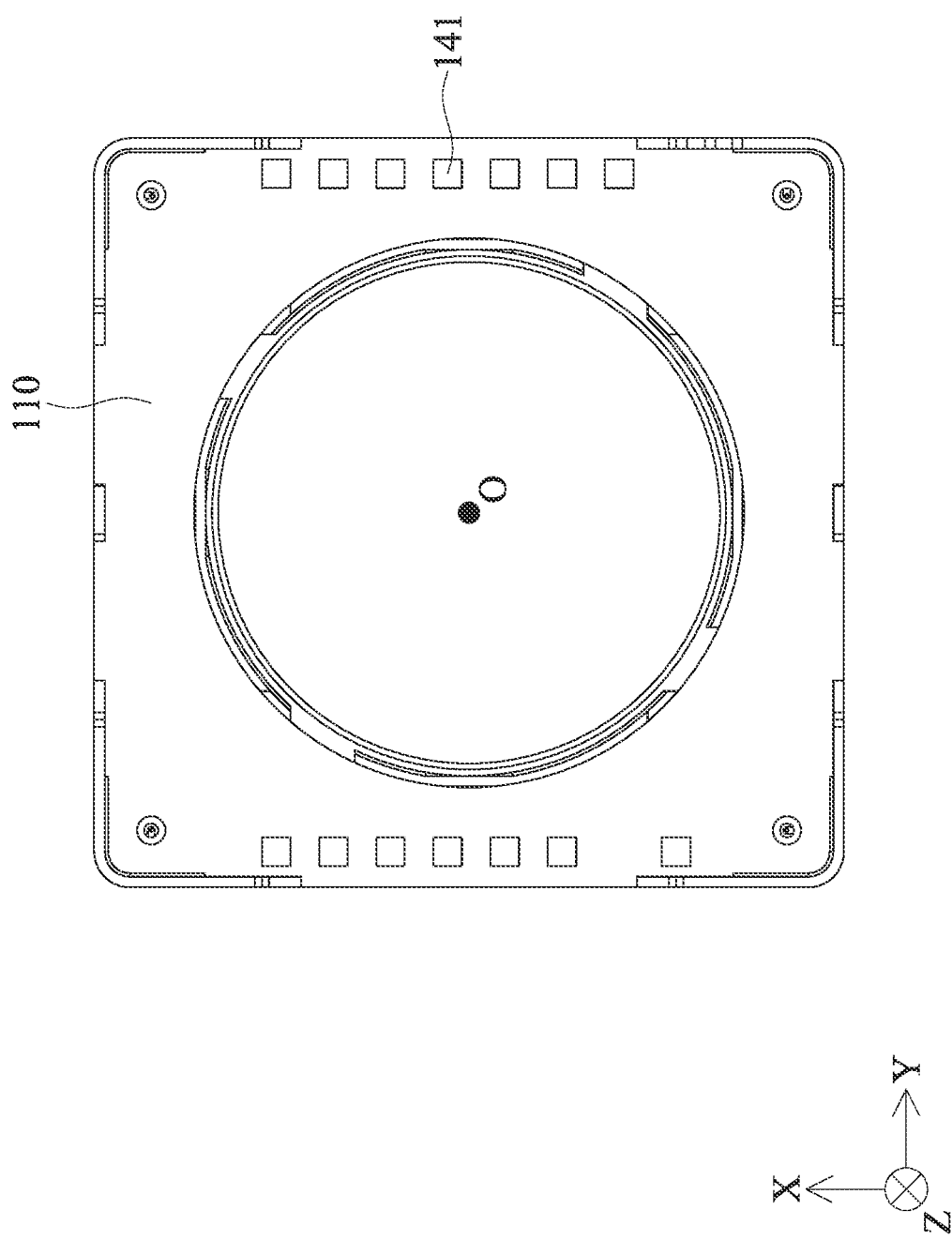
FIG. 13 is a bottom view of the optical element driving mechanism.

FIG. 13 is a bottom view of the optical element driving mechanism 1. The circuit member 140 has an external electrical connection surface 141 perpendicular to the optical axis O. The external electrical connection surface 141 is exposed from the bottom unit 110. An electronic part or an electronic element may be mounted on the external electrical connection surface 141 by surface mount technology (SMT), thereby reducing the volume of the optical element driving mechanism 1. In other embodiments, the circuit member 140 has an external electrical connection surface parallel to the optical axis O. An external circuit or an external element may be electrically connected to the external electrical connection surface by welding or the like. Alternatively, the external electrical connection surface may be made of a flexible material such as a flexible printed circuit (FPC). Therefore, the external electrical connection surface may be bent to be assembled. The possibility of connecting the external electrical connection surface to the external circuit or the external element may be increased, and the assembling efficiency may be further enhanced.

Figure 14:
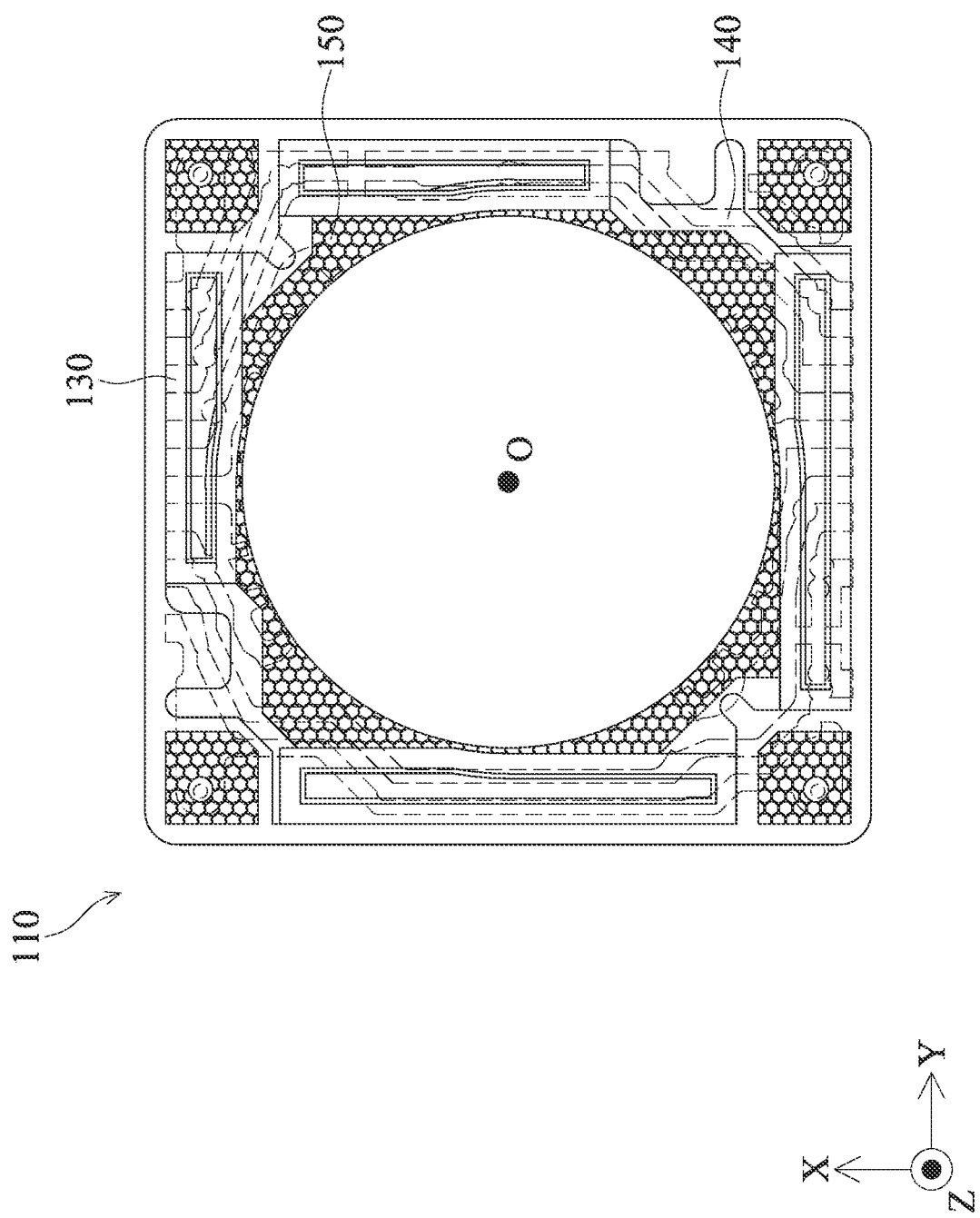
FIG. 14 is a top view of the bottom unit and a strengthening member.

FIG. 14 is a top view of the bottom unit 110 and a strengthening member 150. Since the height of the optical element driving mechanism 1 is thin, the elements therein may be damaged when the optical element driving mechanism 1 functions or the optical element driving mechanism 1 is affected by the environment. For example, breakage of the wire of the driving circuit assembly 130 may occur.

To strengthen the structural strength of the optical element driving mechanism 1, the strengthening member 150 may be provided. The strengthening member 150 is located at the base member 120 and may be integrally formed with the base member 120. When viewed along a direction that is parallel to the optical axis O, the base member 120 partially overlaps the circuit member 140 and the strengthening member 150. To prevent a short circuit, the strengthening member 150 and the driving coil assembly 130 are electrically independent.

When viewed along a direction that is perpendicular to the optical axis O, the strengthening member 150 partially overlaps the driving coil assembly 130. Therefore, when the optical element driving mechanism 1 moves or a shock occurs, the pressure that the driving coil assembly 130 borne may be dispersed by the strengthening member 150. The durability of the bottom unit 110 may be enhanced, and the overall structure of the bottom unit 110 may be protected. In some embodiments, the height of the strengthening member 150 is the same as the height of the driving coil assembly 130.

Figure 15:
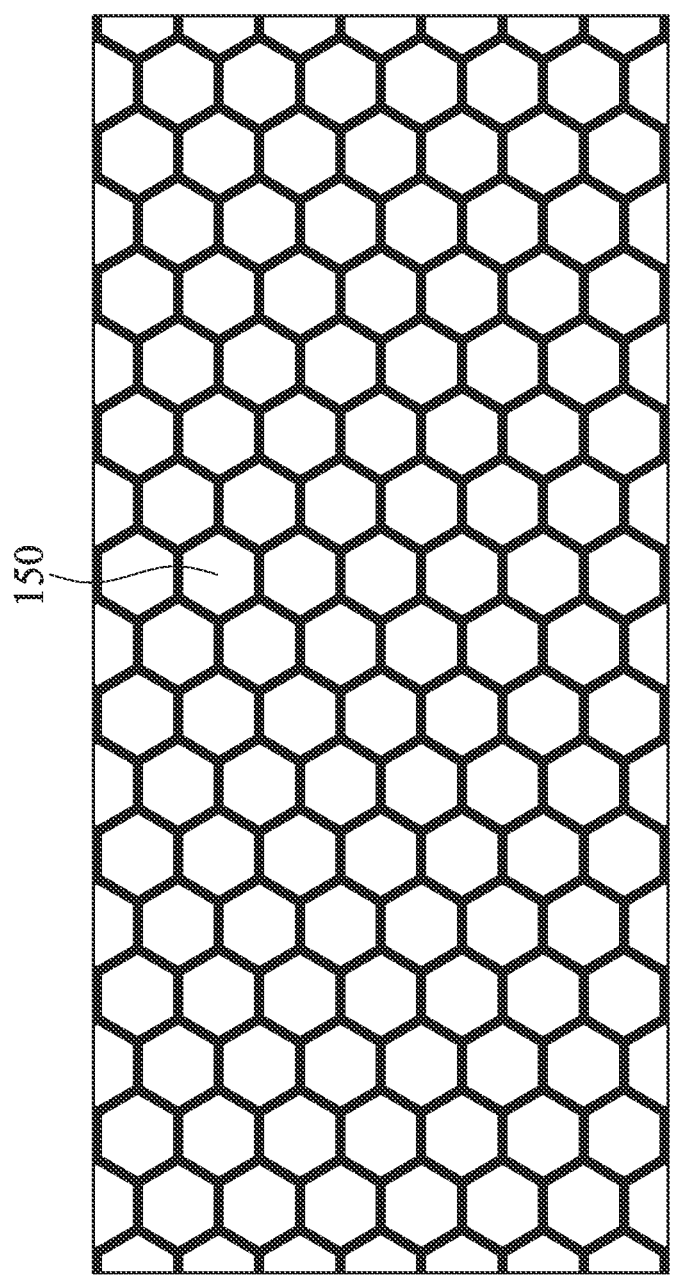
FIG. 15 is a schematic view of the strengthening member.

The strengthening member 150 is a plate structure, including a plurality of regular shape. FIG. 15 is a schematic view of the strengthening member 150. In this embodiment, the strengthening member 150 includes a honeycomb-shaped structure. However, the strengthening member 150 may include a grid-shaped structure, a concentric circle-shaped structure or other shape depending on requirements of the user or the types of the optical element driving mechanism 1. Additionally, the strengthening member 150 may be made of a metal material such as copper.

Based on this disclosure, the height of the optical element driving mechanism may be reduced by the bottom unit which is integrally formed. Miniaturization may be achieved. Furthermore, the manufacturing process may be simplified and the production cost may be reduced. The optical element driving mechanism of this disclosure may still achieve the original effects while being miniaturized. Also, the structural strength of the optical element driving mechanism may be increased by the strengthening member.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various Changes, substitutions, and alterations herein without departing from the spirit and scope of this disclosure.

In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism, comprising:
   a fixed part comprising a base member;
   a movable part connected to an optical element with an optical axis, wherein the movable part is movable relative to the fixed part, and the movable part is accommodated in the fixed part;
   a first driving assembly driving the movable part to move relative to the fixed part, wherein the first driving assembly is disposed in the base member; and
   a strengthening member embedded in the base member, wherein the strengthening member and the first driving assembly are electrically independent,
   wherein the optical element driving mechanism comprises an opening, and
   wherein the strengthening member includes a central portion and a plurality of corner portions, and when viewed along the optical axis, the central portion is located between the opening and the first driving assembly, and two of the corner portions are located at opposite ends of the first driving assembly.

2. The optical element driving mechanism as claimed in claim 1, wherein the strengthening member comprises a metal material.

3. The optical element driving mechanism as claimed in claim 1, wherein the base member comprises a first base and a second base directly connected to the first base, and a hardness of the first base is different from a hardness of the second base.

4. The optical element driving mechanism as claimed in claim 3, further comprising a circuit assembly formed on the second base, wherein when viewed along the optical axis, the circuit assembly is exposed from a surface of the second base.

5. The optical element driving mechanism as claimed in claim 4, wherein the circuit assembly is electrically connected to the first driving assembly.

6. The optical element driving mechanism as claimed in claim 4, wherein the circuit assembly is located between the first base and the second base.

7. The optical element driving mechanism as claimed in claim 4, wherein in a direction that is parallel with the optical axis, a size of the first driving assembly is greater than a size of the circuit assembly.

8. The optical element driving mechanism as claimed in claim 1, further comprising a second driving assembly driving the movable part to move relative to the fixed part, wherein when viewed along the optical axis, the first driving assembly at least partially overlaps the second driving assembly.

9. The optical element driving mechanism as claimed in claim 8, wherein when viewed along a direction that is perpendicular to the optical axis, the first driving assembly does not overlap the second driving assembly.

10. The optical element driving mechanism as claimed in claim 8, wherein the second driving assembly comprises a magnetic element and a coil corresponding to the magnetic element.

11. The optical element driving mechanism as claimed in claim 8, wherein the magnetic element corresponds to the first driving assembly.

12. The optical element driving mechanism as claimed in claim 1, wherein the strengthening member is a plate structure comprising a grid-shaped structure or a honeycomb-shaped structure.

13. The optical element driving mechanism as claimed in claim 1, wherein the strengthening member is disposed between the optical element and the first driving assembly.

14. The optical element driving mechanism as claimed in claim 1, wherein the first driving assembly comprises:
   a connection wire;
   a plurality of first driving coils connected to each other via the connection wire; and a plurality of second driving coils, wherein when viewed along the optical axis, the first driving coils at least partially overlap the second driving coils.

15. The optical element driving mechanism as claimed in claim 14, wherein when viewed from a direction that is perpendicular to the optical axis, the connection wire at least partially overlaps the second driving coils.

16. An optical element driving mechanism, comprising:
a fixed part comprising a base member;
a movable part connected to an optical element with an optical axis, wherein the movable part is movable relative to the fixed part, and the movable part is accommodated in the fixed part;
a first driving assembly driving the movable part to move relative to the fixed part, wherein the first driving assembly is disposed in the base member; and
a strengthening member embedded in the base member,
wherein the strengthening member and the first driving assembly are electrically independent,
wherein the first driving assembly comprises:
   a connection wire;
   a plurality of first driving coils connected to each other via the connection wire; and
   a plurality of second driving coils, wherein when viewed along the optical axis, the first driving coils at least partially overlap the second driving coils, and
wherein the number of turns of each one of the first driving coils is different than the number of turns of each one of the second driving coils.

17. An optical element driving mechanism, comprising:
a fixed part comprising a base member;
a movable part connected to an optical element with an optical axis, wherein the movable part is movable relative to the fixed part, and the movable part is accommodated in the fixed part;
a first driving assembly driving the movable part to move relative to the fixed part, wherein the first driving assembly is disposed in the base member; and
a strengthening member embedded in the base member,
wherein the strengthening member and the first driving assembly are electrically independent,
wherein the first driving assembly comprises:
   a connection wire;
   a plurality of first driving coils connected to each other via the connection wire; and
   a plurality of second driving coils, wherein when viewed along the optical axis, the first driving coils at least partially overlap the second driving coils, and
wherein a width of the connection wire is greater than a width of each one of the first driving coils.

* * * * *